(12) United States Patent
Stieghorst et al.

(10) Patent No.: US 12,053,920 B2
(45) Date of Patent: Aug. 6, 2024

(54) METHOD FOR PRODUCING A COMPONENT AND SYSTEM FOR THIS PURPOSE

(71) Applicant: MEDIZINISCHE HOCHSCHULE HANNOVER, Hannover (DE)

(72) Inventors: Jan Stieghorst, Nienhagen (DE); Theodor Doll, Isernhagen (DE)

(73) Assignee: MEDIZINISCHE HOCHSCHULE HANNOVER, Hannover (DE)

( * ) Notice: Subject to any disclaimer, the term of this patent is extended or adjusted under 35 U.S.C. 154(b) by 149 days.

(21) Appl. No.: 16/770,337

(22) PCT Filed: Nov. 23, 2018

(86) PCT No.: PCT/EP2018/082397
§ 371 (c)(1),
(2) Date: Jun. 5, 2020

(87) PCT Pub. No.: WO2019/110329
PCT Pub. Date: Jun. 13, 2019

(65) Prior Publication Data
US 2023/0405919 A1 Dec. 21, 2023

(30) Foreign Application Priority Data
Dec. 5, 2017 (EP) ..................................... 17205426

(51) Int. Cl.
*B29C 64/112* (2017.01)
*B29C 64/264* (2017.01)
(Continued)

(52) U.S. Cl.
CPC .......... *B29C 64/112* (2017.08); *B29C 64/264* (2017.08); *B29C 64/393* (2017.08); *B33Y 10/00* (2014.12); *B33Y 30/00* (2014.12)

(58) Field of Classification Search
CPC ... B29C 64/112; B29C 64/264; B29C 64/393; B33Y 10/00; B33Y 30/00
See application file for complete search history.

(56) References Cited

U.S. PATENT DOCUMENTS 5,236,812 A * 8/1993 Vassiliou ............... B33Y 10/00
                                                        430/394
6,402,403 B1 * 6/2002 Speakman ............ B29C 64/112
                                                        101/483
(Continued)

FOREIGN PATENT DOCUMENTS

DE      10 2015 101 810 A1    1/2016
DE         102015101810 A1 *  1/2016    ........... B29C 64/112
(Continued)

*Primary Examiner* — Jerzi H Moreno Hernandez
(74) *Attorney, Agent, or Firm* — WC&F IP

(57) ABSTRACT

An apparatus dispenses a raw material in liquid form into a manufacturing zone. The raw material is, by computer-controlled, point-by-point targeted light irradiation, heated and solidified by the region of incidence of a light beam relative to the manufacturing zone being altered in a continuous and/or in a step-by-step manner. The light beam is emitted from the light beam source, or from an optical unit influencing the light of the light beam source, with a substantially ring-shaped light intensity profile. The ring-shaped light intensity profile is formed by a ring-shaped region in which the light intensity initially increases in the direction toward the center of the ring from the outer diameter and then drops off again toward the inner diameter of the ring, with the light intensity being equal to zero in the interior region of the ring.

12 Claims, 3 Drawing Sheets

Figure 1:
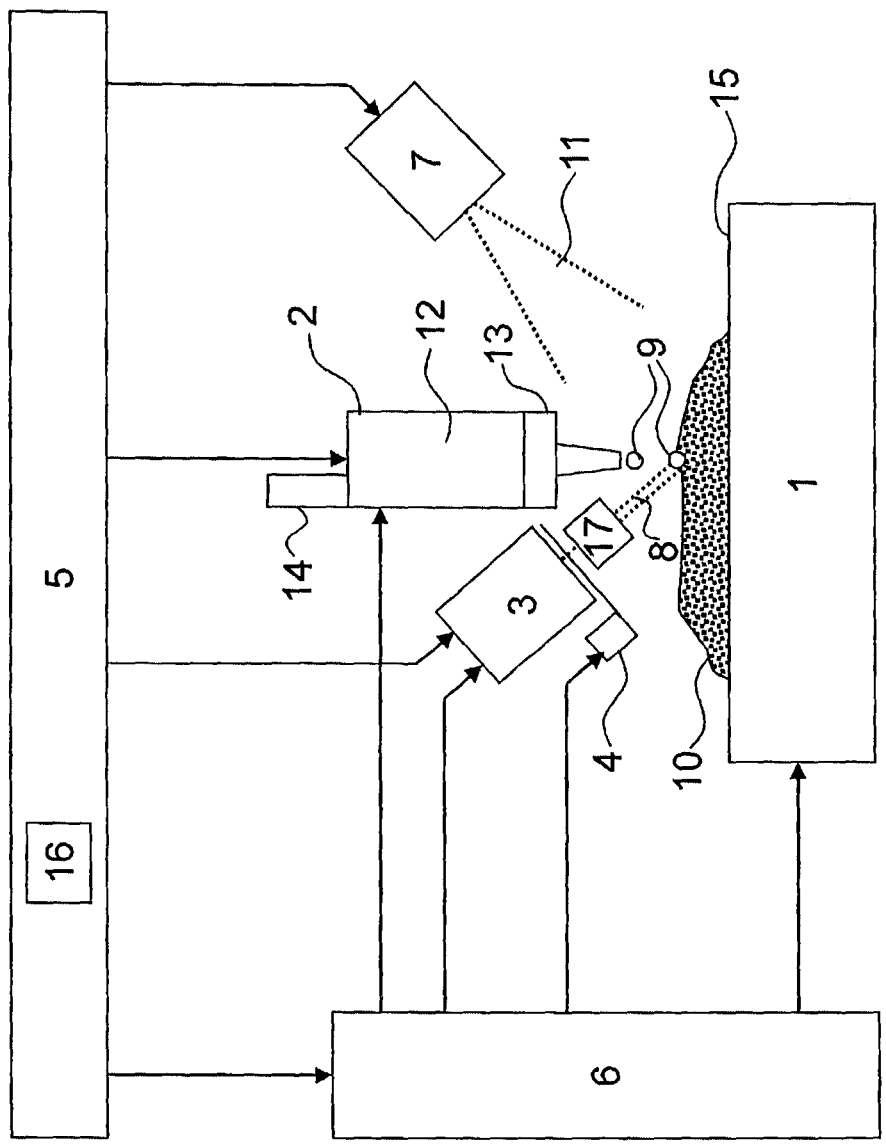

(51) Int. Cl.
*B29C 64/393* (2017.01)
*B33Y 10/00* (2015.01)
*B33Y 30/00* (2015.01)

(56) References Cited

U.S. PATENT DOCUMENTS

| | | | |
|---|---|---|---|
| 2012/0305811 A1* | 12/2012 | Wakabayashi | H05G 2/003 |
| | | | 250/504 R |
| 2016/0046832 A1* | 2/2016 | Wroblesky | B33Y 70/00 |
| | | | 425/375 |
| 2016/0144570 A1* | 5/2016 | Kim | B29C 64/112 |
| | | | 425/174.4 |
| 2017/0028633 A1* | 2/2017 | Evans | B29C 64/393 |

FOREIGN PATENT DOCUMENTS

| | | |
|---|---|---|
| EP | 3 012 079 A1 | 4/2016 |
| WO | 97/48557 A2 | 12/1997 |
| WO | 2016/079062 A1 | 5/2016 |

* cited by examiner

METHOD FOR PRODUCING A COMPONENT AND SYSTEM FOR THIS PURPOSE

The invention relates to a method for producing a component by means of an additive manufacturing process, wherein the component is entirely or partly produced from a liquid raw material solidifiable by heating, wherein the raw material is dispensed in liquid form into a manufacturing zone and is, by means of computer-controlled, point-by-point targeted light irradiation, heated and solidified by the region of incidence of a light beam of a light beam source relative to the manufacturing zone being altered in a continuous and/or in a step-by-step manner. The invention furthermore relates to an apparatus for producing a component by means of an additive manufacturing process.

Examples of additive manufacturing processes are stereolithography, selective laser melting, selective laser sintering, fused deposition modeling, laminated object modeling, 3D printing and gas dynamic cold spray, in particular also all manufacturing methods of rapid prototyping, of rapid tooling and of rapid manufacturing. The present invention relates in particular to additive manufacturing methods, e.g., for the manufacture of components from liquid plastics. The invention relates in particular to the field of medical implant treatment using patient-personalized implants, in particular soft implants.

A generic method and a corresponding apparatus are already known from DE 10 2015 101 810 A1.

The invention is based on the object of further improving the known method and the apparatus with respect to the manufacturing efficiency and enabling a continuous manufacturing process.

This object is achieved in a method of the type mentioned at the beginning in that the light beam is emitted from the light beam source, or from an optical unit influencing the light of the light beam source, with a substantially ring-shaped light intensity profile. The invention has the advantage that the component parts normally used in such an additive manufacturing method for providing and dispensing the raw material can be used more reliably and with less maintenance support. In particular, a clogging or blockage of a raw material dispensing unit, or a raw material dispensing nozzle thereof, by prematurely solidified raw material can thus be prevented or at least significantly reduced. Thus a continuous manufacturing process is first enabled by means of the invention because a nozzle blockage can be prevented. This is achieved by the substantially ring-shaped light intensity profile, with which it is possible to adjust the light emission in the region of the raw material dispensing nozzle in such a way that the raw material is not already solidified in the nozzle or immediately after leaving the nozzle. This also includes the complete prevention of radiation absorption in the region of the dispensing device.

A further positive aspect of the invention is the prevention or at least reduction of the heating of the dispensing device caused by radiation, which can lead to a change in the material parameters such as, for example, the viscosity. As this can strongly influence the stability of the process, this can be prevented by the invention without additional effort. Normally, one would consider complex cooling and temperature-regulating systems here, but, with the invention, these can be obviated or at least dimensioned to be smaller.

The light of the light beam source can comprise, for example, light in the visible spectrum, but also UV and IR components.

The substantially ring-shaped light intensity profile can also be designated as a substantially torus-shaped light intensity profile. A torus is a geometric object known from mathematics. One can visualize a torus as a "bead-like"-shaped surface with a hole in the middle, approximately in the form of a life ring, tire or doughnut. The substantially ring-shaped light intensity profile proposed according to the invention is correspondingly characterized by a ring-shaped region, in which the light intensity increases at first from the outer diameter in the direction toward the middle of the ring and then decreases again toward the inner diameter of the ring. In the inner region of the ring, i.e., inside the inner diameter, the light intensity is substantially equal to zero. In this respect, to put it more precisely, the substantially ring-shaped light intensity profile has the shape of a "half" ring since the light intensity is always equal to or greater than zero there.

In the cross section, the substantially ring-shaped light intensity profile, i.e., the light intensity over a radial coordinate r, can have a curved and/or angular progression, up to intensity profiles with a rectangular cross section. This can prevent undesired temperature peaks of a curved ring-shaped profile (at the apex). Furthermore, by using multiple and/or robotically-controlled beam emission devices, suitable light intensity profiles could be generated which only irradiate the material to be irradiated. Until now, bordering regions which have already been cross-linked are also typically irradiated, which can lead to an overheating and thus to a thermal degradation, in the limiting case.

The use of such a light intensity profile has the advantage that a relatively fast targeted solidification of the raw material in the desired regions is also possible and this prevents, to the greatest possible extent, an undesired or uncontrolled spread of the applied raw material that is still liquid, which would occur if the overall light intensity were reduced. The ring-shaped light intensity profile can be generated in the emission region of the light, i.e., where the light beam is emitted from the light beam source or from the optical unit influencing the light of the light beam source. Alternatively or additionally, the ring-shaped light intensity profile can also be generated in the region of incidence of the light beam, i.e., in the manufacturing zone. The ring shape can be the shape of a circular (rotationally-symmetric) ring or a ring that is elliptical in plan view or a similar shape. For example, if the light beam is emitted from the light beam source or the optical unit at an oblique angle to the manufacturing zone, i.e., not exactly perpendicular to the manufacturing zone, then because of this a ring-shaped light intensity profile that is circular in the emission region is distorted into an oval light intensity profile in the region of incidence. But this is not disadvantageous for the implementation of the invention. If a circular ring-shaped light intensity profile is intended to be generated in the region of incidence, then this can be achieved by a right-angled orientation of the light beam to the manufacturing zone or by a corresponding rectification compensating for an oblique emission, for example by means of the optical unit.

Possible system limits with respect to the manufacturing speed (printing speed) and the resolution can thus be overcome. Furthermore, the use of a hollow-core fiber, e.g., in the form of a hollow-core fiber optical waveguide that will be explained below, enables a mechanically more flexible construction of the apparatus as a whole, which enables an easier adaptation of the construction to different usage conditions with respect to the variability of the proposed apparatus. Additionally, the flexible construction enables a retrofitting of already-present apparatuses by means of the proposed invention.

According to an advantageous development of the invention, it is provided that the ring-shaped light intensity profile is adjustable with regard to a plurality or all of the parameters listed below:
a) outer diameter of the ring,
b) inner diameter of the ring,
c) area of the region of incidence of the light beam,
d) edge steepness of the light intensity profile,
e) geometrical cross-sectional shape of the light intensity profile,
f) intensity of the light radiation.

In this way, the light intensity profile can be adapted to very different applications. Thus it is possible, in particular, to adjust the light intensity profile to the individual requirements of the additive manufacturing method. Ring-shaped light intensity profiles having a different size (diameter and area) and intensity distribution (sharp/soft edges) can already be generated by adjusting a bend radius of the hollow-core fiber, the light emitting power of the light beam source, elements of the optical unit such as, for example, a lens system, the diameter and the divergence of the hollow-core fiber.

According to an advantageous development of the invention, it is provided that the raw material is a polymer material. This allows, among other things, the production of biocompatible products for the medical area. In particular, the raw material can be a silicone material, for example silicone rubber.

According to an advantageous development of the invention, the raw material is cross-linkable by means of heating, wherein the cross-linking begins only when a prespecified temperature threshold is exceeded. The raw material can therefore be, for example, a thermally-initiatable material, e.g., a temperature-initiated silicone rubber. Thus, the cross-linking does not begin at low temperatures, but begins only when the specified temperature threshold is exceeded. This has the advantage that a premature cross-linking of the raw material in the raw material dispensing nozzle or in a mixing device can be prevented.

According to an advantageous development of the invention, the solidified raw material further has a high elasticity. This has the advantage that it is possible with the invention to produce flexible or highly elastic components, such as, for example, soft-tissue implants for the medical area. The solidified raw material can be in particular a rubbery-elastic material. According to an advantageous development of the invention, the solidified raw material has a Shore hardness within the range from 10 to 90 Shore A, more particularly 20 to 60 Shore A.

According to an advantageous development of the invention, it is provided that the point of incidence of the light beam of the light beam source relative to the manufacturing zone is, during the manufacturing process for the component, repositioned in relation to a raw material dispensing unit which dispenses the raw material drop by drop and/or line by line, so that raw material freshly dispensed by the raw material dispensing unit is immediately heated by the light beam and thereby solidified. The raw material dispensing unit can have a nozzle or a cannula for the drop-by-drop and/or line-by-line dispensing of the raw material. This has the advantage that the component can be produced particularly quickly in virtually any desired shaping by point-by-point application of the raw material. Owing to the heating generated for a short time by the light beam after dispensing of the raw material, this raw material is immediately solidified to the extent that it cannot flow away, e.g., from already printed material, substrate materials, printing bed or other surfaces. The repositioning of the point of incidence of the light beam with the raw material dispensing unit can, for example, be realized such that the light beam source is mechanically coupled in a fixed manner with the raw material dispensing unit and that the emission direction of the light beam is aligned accordingly, and so the light beam is automatically incident on raw material freshly dispensed by the raw material dispensing unit. It is also possible for the light beam source and the raw material dispensing unit to be mechanically decoupled from one another. In this case, it is advantageous to reposition the emission direction of the light beam of the light beam source in relation to the raw material dispensing unit in a computer-controlled manner.

According to an advantageous development of the invention, it is provided that the inner diameter of the ring-shaped light intensity profile is oriented substantially concentrically to a respective raw material drop dispensed by the raw material dispensing unit, in order to solidify this drop by means of light irradiation. This allows an energetically more efficient manufacturing of the component from the raw material, without blocking the raw material dispensing unit.

According to an advantageous development of the invention, it is provided that the light beam is an infrared light beam or has at least predominantly infrared spectral components. This has the advantage that, by means of the light beam source, a high heating efficiency can be achieved in the raw material to be solidified. The light beam source can, for example, be a laser light source, e.g., an infrared laser diode, a carbon monoxide laser or a $CO_2$ laser. A ceramic infrared emitter is also suitable. The desired, finely focused light beam of the light beam source can also be generated by way of a suitable optical system, for example a lens system.

According to an advantageous development of the invention, the light beam of the light beam source is formed as a finely focused light beam. In particular, the light beam can have a diameter 300 μm, even better 200 μm, at the point of incidence on the raw material to be solidified. This allows the production of the component with a high three-dimensional resolution, and so it is possible to produce even finely detailed components.

The object stated at the start is further achieved by an apparatus for producing a component by means of an additive manufacturing process, comprising:
a) a manufacturing zone, at which the component to be produced is formed by means of liquid raw material which is to be arranged there and is solidifiable by heating,
b) a raw material dispensing unit for dispensing the raw material to the manufacturing zone,
c) a light beam source for emitting a light beam,
d) a controllable actuator mechanism with which the point of incidence of the light beam of the light beam source relative to the manufacturing zone is alterable in a continuous and/or in a step-by-step manner,
e) a control unit with a computer, which control unit is configured to control the actuator mechanism,
f) wherein the apparatus is configured to carry out a method for producing a component by means of an additive manufacturing process of the type explained above.

Using such an apparatus, it is likewise possible to realize the advantages stated above with regard to the method. The above-explained equipment-related developments of the invention, too, are also realizable as advantageous developments of the apparatus. The manufacturing zone can in particular be a manufacturing zone of an apparatus for producing a component by means of an additive manufacturing process, e.g., a planar or curved surface on which the raw material is dispensed and where the component is then additively formed.

In particular, the apparatus can have a shutter. The shutter can be controllable by means of the control unit. Furthermore, the apparatus can comprise multiple light beam sources which are controllable with respect to the emission direction. The light beam sources can, with respect to their emission direction and/or with respect to the emission of light (brightness or switching on/switching off of the emission of light), be controllable by the control unit. The light beam source can be an infrared light beam source or have at least predominantly infrared spectral components in the emitted light. In particular, the light beam source can be formed as a laser light source.

According to an advantageous development of the invention, it is provided that the light of the light beam source is emitted by way of an optical unit, which influences the light of the light beam source, wherein the optical unit has at least one hollow-core fiber optical waveguide and/or at least one stop system for generating the substantially ring-shaped light intensity profile. In this way, the light of the light beam source can be advantageously converted into the desired light intensity profile. The use of the hollow-core fiber optical waveguide has the advantage that the optical unit has a certain flexibility, so that an adjustment and repositioning of the emitted light beam to the position of the manufacturing zone to be irradiated is possible in a simple way even with a fixedly arranged light beam source.

The optical unit can alternatively or additionally also have mirror systems for targeted guiding of the light beam. The additionally proposed stop system can be realized simply and cost-effectively, e.g., by manufacturing metal-coated ZnSe windows in the context of a lithographic process. With corresponding photomasks, certain regions of the ZnSe window, which window is transparent for infrared radiation, can be coated with a metal that is reflective for infrared radiation. If the light beam of the light beam source is directed onto the ZnSe window, a portion of the light radiation is reflected by the metal coating. In this way, various light intensity profiles can be generated by means of different photomasks.

According to an advantageous development of the invention, it is provided that the optical unit has at least one diverging lens and/or at least one converging lens for incoupling the light from the light beam source into the hollow-core fiber optical waveguide and/or at least one converging lens for outcoupling the light out of the hollow-core fiber optical waveguide. In this way, certain parameters of the generated light intensity profile, e.g., outer diameter and inner diameter of the ring, can be adjusted with simple means to desired values.

According to an advantageous development of the invention, it is provided that the stop system has at least one region that is transmissive for the light beam and at least one region that is reflective for the light beam. By this means, too, the parameters of the light intensity profile can be advantageously influenced.

According to an advantageous development of the invention, the raw material dispensing unit has a raw material dispensing nozzle, which nozzle can also be referred to as a dosing needle depending on the embodiment. At the outer circumference, the raw material dispensing nozzle can be shaped conically or in any other way such that the raw material dispensing nozzle tapers toward its free end, i.e., the outer cross-section of the raw material dispensing nozzle becomes smaller toward the free end. For example, the raw material dispensing nozzle can have a conical section and a cylindrical section adjacent to the conical section, with which cylindrical section the raw material dispensing nozzle is formed at its free end. Such a shaping of the raw material dispensing nozzle has the advantage that a smaller shading of the light beam occurs and, in this way, the inner diameter of the beam profile of the light beam can be reduced. In this way, an early irradiation of the dispensed raw material can be achieved by means of the light of the light beam source. Moreover, the loss of pressure can be reduced compared to other shapes of raw material dispensing nozzles, e.g., purely cylindrical shapes.

The indefinite article "a (an)" should not be understood to mean a number. Thus if, e.g., mention is made of a component, this is to be interpreted in the sense of "at least one component". Insofar as angle specifications are given in degrees, they refer to a circular dimension of 360 degrees (360°).

The invention will be explained in more detail below on the basis of exemplary embodiments using drawings. In the drawings FIG. 1 shows a schematic illustration of an apparatus for producing a component by means of an additive manufacturing process and FIG. 2—shows, as an excerpt, a further embodiment of such an apparatus and FIGS. 3, 4—show light intensity profiles in plan view and FIGS. 5 to 7—show light intensity profiles in the cross-section.

In the figures, the same reference signs are used for elements corresponding to one another.

Figure 2:
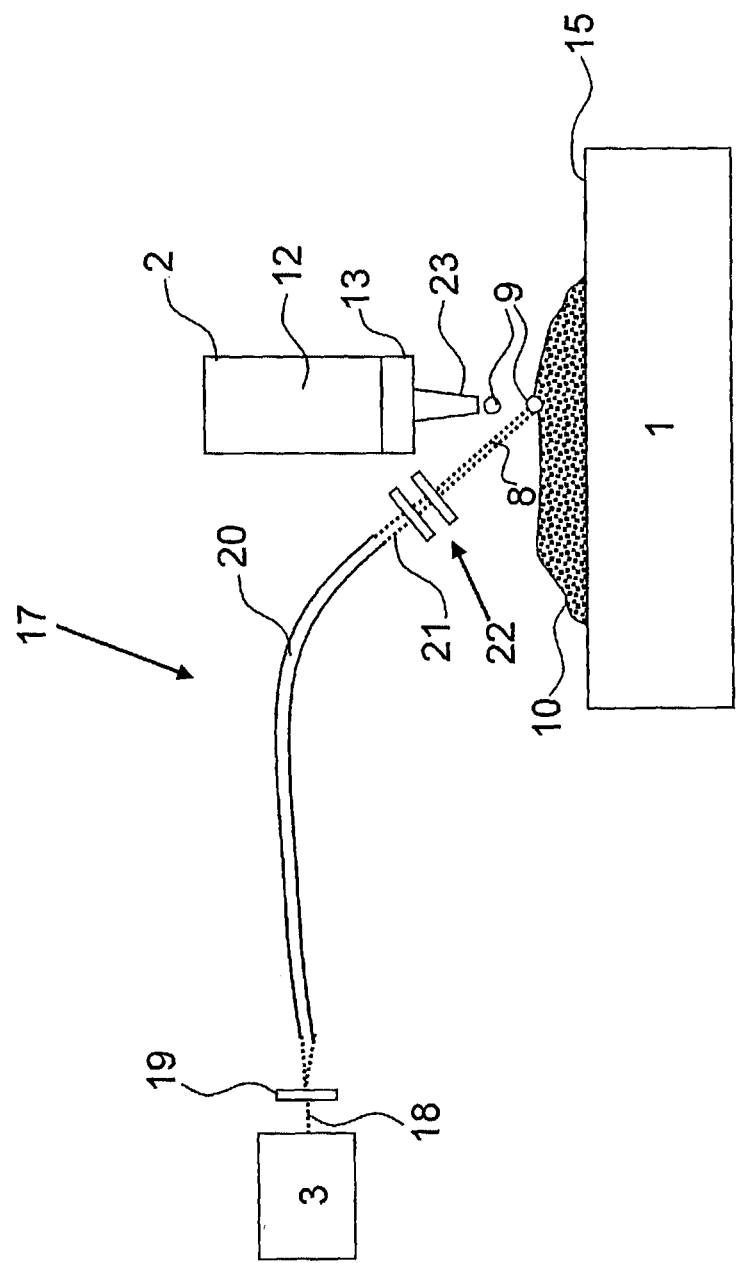

The apparatus, depicted in highly schematic form in FIG. 1, for producing a component 10 comprises the following component parts: a manufacturing zone 1 having a platform 15, a raw material dispensing unit 2, a light beam source 3, a shutter 4, an optical unit 17, a control unit 5 having a computer 16, an actuator mechanism 6 and a heat source 7. For example, the component 10 is produced in the manufacturing zone 1 on the platform 15 by means of the additive manufacturing process. To this end, the raw material dispensing unit 2 dispenses raw material drops 9, from raw material 12 kept available in liquid form therein. After they impact in the manufacturing zone 1, the raw material drops 9 are heated and thus solidified by a light beam 8 of the light beam source 3. To carry out the additive manufacturing process, it is necessary to alter the position of the raw material dispensing unit 2 relative to the manufacturing zone 1 or to the component 10 already produced in part thereon. In this case, the light beam source 3 must be repositioned to the same extent. The actuator mechanism 6 serves for this purpose. For example, said mechanism can be formed in such a way that the manufacturing zone 1 is, for example, moved in two spatial directions in a horizontal plane. In addition, a possibility for adjustment in the third spatial direction, i.e., upward and downward, can also be present. Alternatively or additionally, the actuator mechanism 6 can also alter the light beam source 3 and the raw material dispensing unit 2 with respect to their position.

The control unit 5 controls the entire manufacturing process in such a way that the individual method steps are controlled by a computer 16 on which a computer program runs, for example by the raw material dispensing unit 2 being controlled for dispensing a raw material drop 9 and the actuator mechanism 6 being controlled for appropriate positioning of the individual component parts. Moreover, it is possible, via the control unit 5, to control the light beam source 3 with respect to the light emission of the light beam 8, for example by switching the light beam 8 on and off. If a light beam source 3 is used in which the light beam 8 cannot be switched on and off within the necessary short time, the shutter 4 can be additionally used. Said shutter acts as a stop introducible into the light beam 8, and so, by mechanical actuation of the shutter 4, for example from the actuator mechanism 6, the light beam 8 of the light beam source 3 can be interrupted for a short time and be uninterrupted again.

The raw material dispensing unit 2 can comprise a temperature regulation unit 13 by means of which the liquid raw material 12 can be already temperature-regulated in the raw material dispensing unit 2. The temperature regulation can be used for controlling the viscosity and the degree of cross-linking of the liquid raw material 12. Furthermore, the raw material dispensing unit 2 can comprise a reserve of curing-promoting and/or electrically conductive material 14 which can be admixed with the raw material 12 via a mixer. In this way, it is possible, for example, to admix carbon nanotubes for producing conductive regions of the component 10 with the raw material 12 as required.

Optionally, a thermal after-treatment of the raw material can be carried out by means of the heat source 7, for example in order to achieve a final complete curing of the raw material. The heat source 7 can likewise be controlled by the control unit 5, e.g., switched on and off. The component 10 can be heated by means of the heat source 7, e.g., by thermal radiation 11 being emitted onto the component or the heat being transferred to the component 10 by heat conduction or convective heat transfer. The heat source 7 can also be realized in ways other than that depicted, e.g., by means of a heated manufacturing zone 1, such as, for example, a heated printing bed.

Additionally, it is recognizable that the light beam is guided from the light beam source 3 by way of an optical unit 17, from which the widened light beam 8 is emitted with the desired substantially ring-shaped light intensity profile and is incident on the manufacturing zone 1 or in the region of a raw material drop 9.

An advantageous embodiment of the optical unit 17 explained above is illustrated with reference to FIG. 2. It can be seen that a strongly-focused light beam 18 is initially emitted from the light beam source 3, i.e., a laser beam. Said light beam fans out due to a diverging lens 19 and is incoupled into a hollow-core fiber optical waveguide 20. The hollow-core fiber optical waveguide 20 is formed similarly to a tube, i.e., said waveguide has the optical waveguide material in a ring-shaped outer region and is hollow in the center. The light 21 emitted from the hollow-core fiber optical waveguide 20 is guided by way of one or more lenses 22 and then emitted as a light beam 8 onto the manufacturing zone 1 or the raw material drop 9. The lenses 22 serve for adapting the dimensions of the ring-shaped light intensity profile, e.g., for the case that no hollow-core fiber optical waveguide 20 already having appropriate dimensions is suitable.

Additionally it can be seen that the raw material dispensing unit 2 has a raw material dispensing nozzle 23, by way of which nozzle the raw material 12 is dispensed in doses. The raw material dispensing nozzle 23 is formed in a manner tapering toward its free end at the outer circumference, e.g., with a conical shape.

Figure 3:
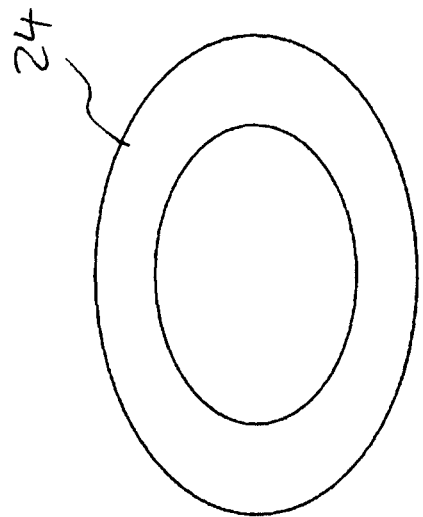

FIG. 3 shows a first embodiment of a ring-shaped light intensity profile 24 in plan view, i.e., in a view in a perpendicular sectional plane through the light beam 8. Light is emitted there in the ring-shaped region between the outer diameter $r_a$ and the inner diameter $r_i$. Substantially no light is emitted within the inner diameter $r_i$, nor outside of the outer diameter $r_a$.

Figure 4:
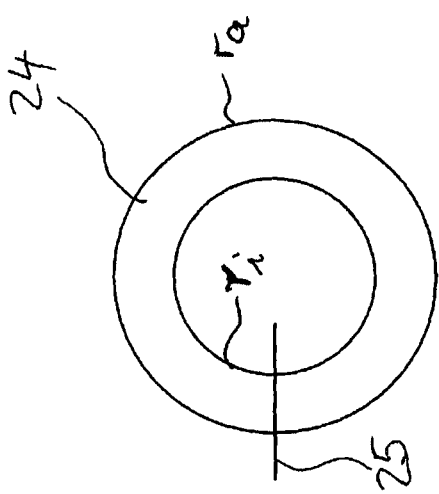

FIG. 4 shows a further embodiment of a ring-shaped light intensity profile 24, which, in contrast to FIG. 3, is not circular but has an elliptical geometry.

Figure 5:
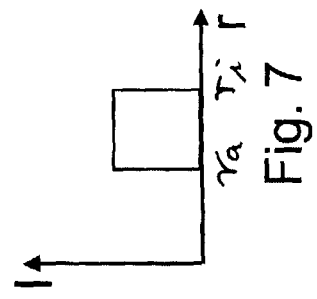
Figure 6:
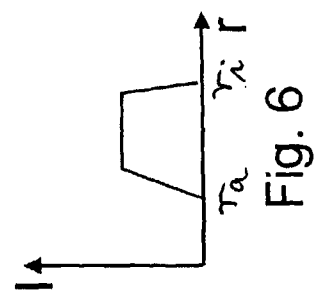
Figure 7:
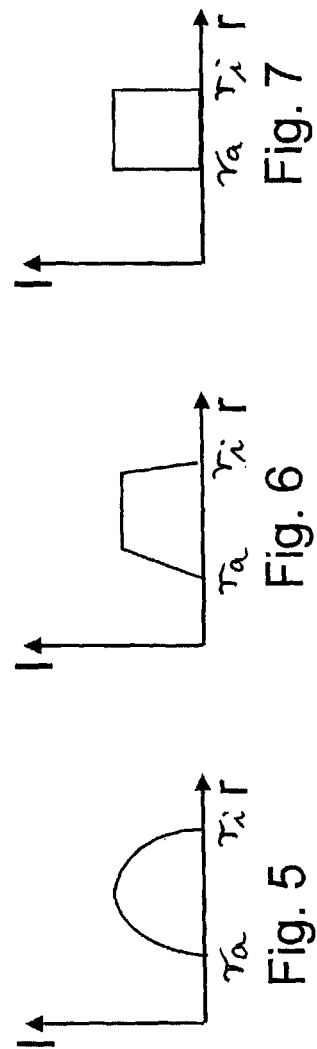

FIGS. 5 to 7 show exemplary light intensity profiles in a sectional plane 25 which is shown in FIG. 3. Here, the light intensity I is respectively plotted against a radial coordinate r. As can be seen, very different configurations of the light intensity profile are possible, with a curved progression of the light intensity I over the radial coordinate r, e.g., with an arcularly curved progression, as depicted in FIG. 5, or with substantially linearly rising and falling edges, which can have the same edge steepness or different edge steepnesses (FIG. 6), or a substantially rectangular intensity progression (FIG. 7).

The invention claimed is:

1. A method for producing a component by an additive manufacturing process, wherein the component is entirely or partly produced from a liquid raw material solidifiable by heating, comprising:
   dispensing the raw material in liquid form into a manufacturing zone; and
   heating and solidifying the raw material with a light beam using a computer-controlled, point-by-point targeted light irradiation, wherein a region of incidence of the light beam of a light beam source relative to a manufacturing zone is altered in a continuous and/or in a step-by-step manner,
   wherein the light beam is emitted from the light beam source, or from an optical unit influencing light of the light beam source, with a ring-shaped light intensity profile,
   wherein the ring-shaped light intensity profile has a ring-shaped region with an outer diameter and an inner diameter, wherein in the ring-shaped region the light intensity initially increases in a direction toward a center of the ring-shaped region from the outer diameter and then decreases toward the inner diameter of the ring-shaped region, with the light intensity being equal to zero within the inner diameter of the ring-shaped region.

2. The method as claimed in claim 1 wherein the ring-shaped light intensity profile is adjustable with regard to a plurality or all parameters selected from the group consisting of:
   a) the outer diameter of the ring-shaped region,
   b) the inner diameter of the ring-shaped region,
   c) area of the region of incidence of the light beam,
   d) edge steepness of the light intensity profile,
   e) geometrical cross-sectional shape of the light intensity profile, and
   f) intensity of the light radiation.

3. The method as claimed in claim 1 wherein the raw material is a polymer material.

4. The method as claimed in claim 1 wherein the raw material is cross-linkable by heating to a prespecified temperature.

5. The method as claimed in claim 1 further comprising repositioning the region of incidence of the light beam of the light beam source relative to the manufacturing zone during the manufacturing process for the component wherein repositioning is in relation to a raw material dispensing unit which dispenses the raw material drop by drop and/or line by line, so that raw material freshly dispensed by the raw material dispensing unit is immediately heated by the light beam and thereby solidified.

6. The method as claimed in claim 1 wherein an inner diameter of the ring-shaped light intensity profile is oriented concentrically to a respective raw material drop dispensed by a raw material dispensing unit, in order to solidify the respective raw material drop by light irradiation.

7. The method as claimed in claim 1 wherein the light beam is an infrared light beam or has at least predominantly infrared spectral components.

8. The method as claimed in claim 1 further comprising regulating a temperature of the liquid raw material to control viscosity and a degree of cross-linking of the liquid raw material.

9. An apparatus for producing a component by an additive manufacturing process, comprising:
a manufacturing zone at which the component to be produced is formed by liquid raw material which is arranged at the manufacturing zone and is solidifiable by heating,
a raw material dispensing unit for dispensing the raw material to the manufacturing zone,
a light beam source for emitting a light beam,
a controllable actuator mechanism with which a point of incidence of the light beam of the light beam source relative to the manufacturing zone is alterable in a continuous and/or in a step-by-step manner, and
a control unit with a computer configured to control the actuator mechanism,
wherein the apparatus is configured to carry out a method for producing a component by means of an additive manufacturing process, the method comprising:
dispensing the raw material in liquid form into the manufacturing zone; and
heating and solidifying the raw material with the light beam using a computer-controlled, point-by-point targeted light irradiation, wherein a point of incidence of the light beam relative to a manufacturing zone is altered in the continuous and/or in the step-by-step manner,
wherein the light beam is emitted from the light beam source, or from an optical unit influencing light of the light beam source, with a ring-shaped light intensity profile,
wherein the ring-shaped light intensity profile has a ring-shaped region with an outer diameter and an inner diameter, wherein in the ring-shaped region the light intensity initially increases in a direction toward a center of the ring-shaped region from the outer diameter and then decreases toward the inner diameter of the ring-shaped region, with the light intensity being equal to zero within the inner diameter of the ring-shaped region.

10. The apparatus as claimed in claim 9 wherein the light of the light beam source is emitted by way of an optical unit which influences the light of the light beam source, wherein the optical unit has at least one hollow-core fiber optical waveguide.

11. The apparatus as claimed in claim 10 wherein the optical unit has at least one diverging lens and/or at least one converging lens for incoupling the light from the light beam source into the hollow-core fiber optical waveguide and/or at least one converging lens for outcoupling the light out of the hollow-core fiber optical waveguide.

12. The apparatus as claimed in claim 9 wherein the raw material dispensing unit has a raw material dispensing nozzle comprising an outer circumference at a dispensing end and tapering toward a free end at the outer circumference.

* * * * *